Patented May 7, 1929.

1,711,873

UNITED STATES PATENT OFFICE.

ERNEST GEORGE BECKETT AND JOHN THOMAS, OF CARLISLE, ENGLAND, ASSIGNORS TO SCOTTISH DYES, LIMITED, OF CARLISLE, ENGLAND.

PROCESS OF PREPARING DYESTUFFS DERIVED FROM DIPHTHALIMIDO ANTHRAQUINONES.

No Drawing. Application filed July 28, 1924, Serial No. 728,767, and in Great Britain September 14, 1923.

This invention relates to the manufacture and use of dyestuffs derived from phthalimido anthraquinones.

It is particularly directed to the production of a dyestuff for dyeing blue shades on acetyl silk, that is cellulose acetate threads films or the like, especially those obtained by direct spinning.

The invention in brief consists in a method for the production of a dyestuff comprising the nitration of a diphthalimido anthraquinone (see U. S. specification No. 1,528,470) followed by treatment with an alkaline sulphide and hydrolysis with sulphuric acid.

The invention also consists in a method of imparting colours to cellulose acetate fibres or the like which comprises dyeing them with an aqueous suspension or solution of the anthraquinone body obtained by nitrating a diphthalimido anthraquinone followed by treatment of an alkaline sulphide and then hydrolysis with sulphuric acid.

The invention specifically includes a method of applying blue shades to cellulose acetate fibres or the like by dyeing with the product obtained by the nitration of 1.5-diphthalimido-anthraquinone followed by treatment by an alkaline sulphide and then hydrolysis with sulphuric acid.

The following examples are given as illustrative of methods of carrying the invention into effect:—

Example 1.

This deals with the nitration of 1.5-diphthalimido-anthraquinone and then with the simultaneous treatment with an alkaline sulphide and partial hydrolysis.

According to this example 50 grams of 1.5-diphthalimido-anthraquinone are dissolved in 500 grams of 97% sulphuric acid at 10° C. A nitrating mixture is made up by mixing 62 grams of 80% nitric acid with 50 grams of 97% sulphuric acid, and this when cooled is slowly added to the sulphuric acid solution of the 1.5-diphthalimido-anthraquinone. During the addition of the nitrating mixture the temperature is kept at 25° C. After the addition of the mixed acid is complete the temperature is raised to 30° C. and kept at this value for one hour. The melt is then poured into 5 litres of water, filtered and washed free from acid.

The paste which results from this treatment is next simultaneously treated with an alkaline sulphide and partially hydrolyzed in one way as follows:—

The quantity resulting from the nitration of 50 grams of 1.5-diphthalimido-anthraquinone is suspended in 500 ccs. of water and this suspension is added to a litre of water at 80° C., in which there have been dissolved 227 grams of sodium sulphide crystals and 35 grams of caustic soda. The liquor is kept at a temperature of 80° C. for one hour, after which the mixture is filtered hot and the precipitate washed with cold water. This wet precipitate or paste comprises a blue substance slightly soluble in hot water. It contains about 15.66–15.85% of nitrogen, and about 5.78–6.28% of sulphur; it has a molecular weight of about 600 and melts above 320°. Its solution in water is greenish blue, and it is soluble to a royal blue in most ordinary organic solvents. It is, however, practically insoluble in carbon tetrachloride and carbon disulphide. It dissolves in sulphuric acid to a pale brown that is not changed by gentle heating. The hot sulphuric acid solution becomes a deep royal blue colour on addition of boric acid and a deep bluish purple on addition of formaldehyde.

The constitution of the body as far as can be ascertained indicates that it consists of 4.5.8-4'.5'.8'-hexamino-1.1'-dianthraquinone thio ether. It can be employed for dyeing blue shades on cellulose acetate fibres or the like.

Example 2.

This deals with a modified method of hydrolyzing the product prepared by nitration from 1.5-diphthalimido-anthraquinone according to Example 1, treatment with an alkaline sulphide and hydrolysis being effected independently.

In this example the nitrated paste of Example 1 is converted into a dyestuff by independent operations of treatment with an alkaline sulphide and hydrolysis in place of effecting these two treatments simultaneously. As an example of this method of procedure, the paste may be dried and hydrolyzed by treatment with sulphuric acid, after which the hydrolyzed body may be treated with alkaline sodium sulphide.

*Example 3.*

This deals with a complete process for the nitration of 1.5 diphthalimido anthraquinone followed by treatment with an alkaline sulphide and then with sulphuric acid.

In this example a cast iron stirrer vessel fitted with a jacket which is adapted for heating and cooling is charged with 118 kgs. of 94% sulphuric acid and 122 kgs. of 23% oleum. The two acids are thoroughly mixed and the temperature raised to 60° C. The pan is then charged with 32 kgs. of dry powdered sodium nitrate and the mixture is stirred for a further period of ½-hour. Cooling water is then turned on to the jacket, and when the temperature of the mixture is down to 25° C., 36 kgs. of dry powdered 1.5-diphthalimido-anthraquinone are added. The powder is added at such a rate that the temperature remains between 25 and 27° C.; it usually takes 1¾ to 3 hours to carry through this operation, depending on the efficiency of the cooling system. When all the 1.5-diphthalimido-anthraquinone has been added and apparently dissolved, the temperature is raised to 30° C. and kept at this for 3 hours. The charge is then blown over into at least 4091 litres of cold water and the nitro body is filtered off and washed with hot water till practically acid free. There is thus obtained about 91 kgs. of paste and the yield of dry material is usually about 95% of theory. The paste is used straight away in the next operation without being dried.

In an iron stirrer vessel 9 kgs. of caustic soda are dissolved in 2728 litres of cold water and the whole of the batch of nitro body paste described above is added and well stirred. There is then added 91 kgs. of crystallyzed sodium sulphide and after this has dissolved the temperature is raised slowly, taking 2½ hours to reach 50° C., and then more rapidly to boiling and boiled for ½-hour. The whole process occupies about 5 to 6 hours. To the hot mixture is then added 204 kgs. of salt and the whole well stirred. Stirring is continued until the temperature has fallen to about 30 to 35° C. The solid is then filtered off and dried. The yield usually is about 42 kgs. of dry powder containing about 8% of salt. This product is partially hydrolyzed.

*Example 4.*

This describes a method of eliminating the phthaloyl groups remaining in the partially hydrolyzed product of Example 3.

The dry product is crushed up to a coarse powder and weighed and is entered in small quantities into an enamelled stirrer pan containing 408 kgs. of 94% sulphuric acid. Owing to the salt contained in it, the mixture froths from the escape of hydrochloric gas and this controls the rate of addition. When all is in, the temperature is raised to 80° C. and kept at this for 4 hours. The charge is then blown over into 4091 litres of water and the solid filtered off by suction, the suction being continued until the solid is sucked as dry as possible. The acid paste is neutralized partly with soda ash and finally with ammonia, when it is ready for standardizing by dyeing test.

*Example 5.*

This describes a modified method of working up the product of Example 3.

According to this modification the contents of the pan containing the partially hydrolyzed body after being heated for 4 hours at 80° C. are diluted with water to bring the strength of the acid down to 70% and the melt is then allowed to cool when the base crystallizes out in a very pure form. It is filtered through porous tiles with 70% acid and finally washed acid free. In this way a very pure form of the base can be obtained.

According to our experiments the body obtained by the processes described of nitration of 1.5 - diphthalimido - anthraquinone, treatment with an alkaline sulphide and substantially full hydrolysis is a base which appears to consist of 4:5:8-4':5':8'-hexamino-1:1'-dianthraquinone-thio-ether having the structural formula:

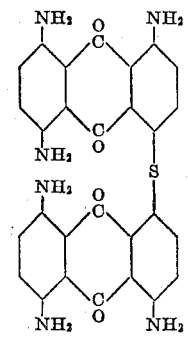

Approximate determinations of nitrogen and sulphur contents for the prepared body and calculations for the theoretical body are given below and for the molecular weight in camphor solution:—

|  | Prepared. | Calculated. |
|---|---|---|
| Nitrogen | 15.66–15.85 | 15.66 |
| Sulphur | 5.78– 6.28 | 5.95 |
| Molecular weight in camphor solution | About 600 | 536 |

The methods described above may be employed with other diphthalimido-anthraquinones as starting bodies in place of 1.5-diphthalimido-anthraquinone; for example, 1.8-diphthalimido anthraquinone may be nitrated treated with sodium sulphide, hydrolyzed and employed for the dyeing of cellulose acetic fibres and the like.

The dyestuffs referred to herein may be used for dyeing other materials besides those prepared from cellulose acetates; for example, wool can be dyed deep blue shades.

The cellulose acetate referred to herein includes the material known as "Celanese" silk (British registered trade-mark "Celanese") at present on the market or any form of acetate fibres or the like, for example as prepared according to British Letters Patent Nos. 139,232, 190,732, 196,641 and 200,186.

Having now described our invention what we claim as new and desire to secure by Letters Patent is:—

1. 4:5:8-4':5':8'-hexamino-1:1'-dianthraquinonyl-thio-ether.

2. Materials dyed by 4:5:8-4':5':8'-hexamino-1:1'-dianthraquinonyl thio ether.

3. The process which comprises nitrating a diphthalimido anthraquinone, reducing the resulting nitro compound with alkaline sodium sulphide, and thereafter subjecting the reduction product to the action of a hydrolyzing agent to eliminate phthaloyl groups from said reduction product whereby a hexamino-dianthraquinonyl-thio-ether is formed.

4. The process which comprises nitrating 1.5 diphthalimido anthraquinone, reducing the resulting nitro compound with alkaline sodium sulphide, and thereafter subjecting the reduction product to the action of a hydrolyzing agent to eliminate phthaloyl groups from said reduction product whereby a hexamino-dianthraquinonyl-thio-ether is formed.

5. The process as in claim 3 in which the hydrolyzing agent is sulphuric acid.

6. The process as in claim 4 in which the hydrolyzing agent is sulphuric acid.

7. A method for the production of a dyestuff comprising nitrating a diphthalimido anthraquinone and then treating the product with an alkaline sulphide and a hydrolyzing agent.

8. A method for the production of a dyestuff comprising nitrating a diphthalimido anthraquinone, treating the resulting product with an alkaline sulphide and then treating the reduced product with a hydrolyzing agent.

9. A method for the production of a dyestuff comprising nitrating a diphthalimido anthraquinone, treating the resulting product with an alkaline sulphide and then treating the reduced product with sulphuric acid.

10. The method for the production of a dyestuff which consists in dissolving about 50 parts of 1.5-diphthalimido anthraquinone in 500 parts of concentrated sulphuric acid adding a nitrating mixture thereto at a temperature of about 25° C. raising the temperature to about 30° C. pouring the melt into water, separating the solid product, freeing it substantially from acid and treating the product with an alkaline sulphide and treating the thus resulting product with a hydrolyzing agent.

11. The method for the production of a dyestuff which consists in dissolving about 50 parts of 1.5-diphthalimido anthraquinone in 500 parts of concentrated sulphuric acid adding a nitrating mixture thereto at a temperature of about 25° C. raising the temperature to about 30° C. pouring the melt into water separating the solid product, freeing it substantially from acid, suspending the paste thus formed in about 500 parts of water adding the suspension to about a 1000 parts of water at about 80° C. in which there has been dissolved about 227 parts of sodium sulphide crystallized and 35 parts of caustic soda maintaining the temperature of about 80° C. for about 1 hour filtering the mixture whilst hot and washing the precipitate with cold water and treating the thus resulting product with a hydrolyzing agent.

12. An organic dyestuff of the anthraquinone series containing about 15.66 to 15.85% of nitrogen and about 5.78 to 6.28% of sulphur having a molecular weight of about 600 melting above about 320° C. dissolving in water to form a green-blue solution substantially insoluble in carbon tetrachloride and carbon disulphide but soluble in most ordinary organic solvents giving royal blue solutions dissolving in sulphuric acid giving a pale brown solution which is substantially unchanged by gentle heating, the hot sulphuric acid solution becoming of deep royal blue colour on addition of boric acid and deep blue purple colour on addition of formaldehyde.

In testimony whereof we have signed our names to this specification.

ERNEST GEORGE BECKETT.
JOHN THOMAS.